(12) United States Patent
Jutte et al.

(10) Patent No.: US 10,845,032 B2
(45) Date of Patent: Nov. 24, 2020

(54) LIGHT EMITTING APPARATUS

(71) Applicant: Lumileds LLC, San Jose, CA (US)

(72) Inventors: Petrus Theodorus Jutte, Aachen (DE); Rifat Ata Mustafa Hikmet, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 15/741,724

(22) PCT Filed: Jun. 30, 2016

(86) PCT No.: PCT/EP2016/065332
§ 371 (c)(1),
(2) Date: Jan. 3, 2018

(87) PCT Pub. No.: WO2017/005604
PCT Pub. Date: Jan. 12, 2017

(65) Prior Publication Data
US 2018/0195694 A1 Jul. 12, 2018

(30) Foreign Application Priority Data
Jul. 7, 2015 (EP) .................................. 15175569

(51) Int. Cl.
*F21V 9/00* (2018.01)
*F21V 13/12* (2006.01)
(Continued)

(52) U.S. Cl.
CPC ................ *F21V 13/12* (2013.01); *F21V 9/08* (2013.01); *F21V 9/30* (2018.02); *G02B 27/0927* (2013.01);
(Continued)

(58) Field of Classification Search
CPC ........... F21S 8/085; F21S 41/141; F21V 9/08; F21V 9/30–45; F21V 13/00–14;
(Continued)

(56) References Cited

U.S. PATENT DOCUMENTS 6,272,269 B1 * 8/2001 Naum .................. G02B 6/0026
362/551
9,459,520 B2 10/2016 Nagahara et al.
(Continued)

FOREIGN PATENT DOCUMENTS

JP 2006106703 A 4/2006
JP 2013-145722 A 7/2013
(Continued)

OTHER PUBLICATIONS

EPO as ISA, "International Search Report and Written Opinion" dated Sep. 5, 2016 from International Application No. PCT/EP2016/065332, filed Jun. 30, 2016, 10 pages.
(Continued)

*Primary Examiner* — Jason M Han

(57) ABSTRACT

The present invention relates to a light emitting apparatus. The apparatus comprises a high intensity light source configured to emit light of a first wavelength; a beam shaping optical element configured to redistribute the light of the first wavelength emitted by the high intensity light source into an outgoing light beam having a far field beam cross sectional profile having a spatially flat light distribution; and a light converting member configured to be exposed to the outgoing light beam having the spatially flat light distribution, to convert at least a portion of the light of the first wavelength into light of a second wavelength, and to emit the light of the second wavelength.

16 Claims, 3 Drawing Sheets

(51) Int. Cl.
  G02F 2/02    (2006.01)
  F21V 9/30    (2018.01)
  F21V 9/08    (2018.01)
  G02B 27/09   (2006.01)
  G02F 2/00    (2006.01)
  F21Y 115/30  (2016.01)
  F21Y 115/10  (2016.01)
  F21V 8/00    (2006.01)

(52) U.S. Cl.
  CPC .......... G02B 27/0944 (2013.01); G02F 2/02 (2013.01); *F21Y 2115/10* (2016.08); *F21Y 2115/30* (2016.08); *G02B 6/0008* (2013.01); *G02F 2002/006* (2013.01); *G02F 2203/26* (2013.01)

(58) Field of Classification Search
  CPC ........ G02B 6/0008; G02B 27/09–0994; G02F 2/02; G02F 2002/006; G02F 2203/26; H01L 33/504; H01L 33/58
  USPC .............................. 362/227–249.02, 551–583
  See application file for complete search history.

(56) References Cited

U.S. PATENT DOCUMENTS

| | | |
|---|---|---|
| 9,470,895 B2 | 10/2016 | Sakaue et al. |
| 2009/0027753 A1 | 1/2009 | Lizotte |
| 2011/0279782 A1* | 11/2011 | Huang ................. H04N 9/3111 353/31 |
| 2013/0135710 A1 | 5/2013 | Nagano et al. |

FOREIGN PATENT DOCUMENTS

| | | |
|---|---|---|
| JP | 2015-002160 A | 1/2015 |
| JP | 2015-045843 A | 3/2015 |

OTHER PUBLICATIONS

Extended European Search Report dated Nov. 26, 2015 from European Patent Application No. 15175569.1 filed Jul. 7, 2015, 7 pages.

* cited by examiner

LIGHT EMITTING APPARATUS

CROSS-REFERENCE TO RELATED APPLICATIONS

The present application is a § 371 application of International Application No. PCT/EP2016/065332 filed on Jun. 30, 2016 and titled "LIGHT EMITTING APPARATUS," which claims the benefit of European Patent Application No. 15175569.1 filed on Jul. 7, 2015. International Application No. PCT/EP2016/065332 and European Patent Application No. 5175569.1 are incorporated herein.

FIELD OF THE INVENTION

The invention relates to a light emitting apparatus for producing high brightness light.

BACKGROUND OF THE INVENTION

Illumination systems for generating high brightness illumination are interesting for various applications including spots, stage-lighting, headlamps and digital light projection.

High brightness light with a desirable spectral distribution may be obtained by a light emitting apparatus comprising a light source such as a light emitting diode, LED, or a laser where a light beam comprising light of a first wavelength (e.g. blue light) emitted by the light source is sent towards a light converting member. Hence, the light converting member is illuminated with the light beam comprising the first wavelength. Light of the first wavelength is at least partially converted to light of a second wave length (e.g. yellow light) by the light converting member. White light may then be obtained when light of the first and second wavelengths are mixed. The light beam comprising light of a first wavelength (e.g. blue light) emitted by the light source has a typical power of a several watts. Much effort has been made in order to increase the efficiency of the light conversion at the light converting member. For example, the light converting member may be placed on a static heat sink in order to increase the efficiency of the light conversion. However, there is a need for more improvements of the efficiency of the light conversion at the light converting member.

SUMMARY OF THE INVENTION

It is an object of the present invention to overcome at least some of the above problems, and to provide light emitting apparatus with improved light output.

According to a one aspect, this and other objects are achieved by providing a light emitting apparatus. The light emitting apparatus comprises a high intensity light source configured to emit light of a first wavelength; a beam shaping optical element configured to redistribute the light of the first wavelength emitted by the high intensity light source into an outgoing light beam having a far field beam cross sectional profile having a spatially flat light distribution; and a light converting member configured to be exposed to the outgoing light beam having the spatially flat light distribution, to convert at least a portion of the light of the first wavelength into light of a second wavelength, and to emit the light of the second wavelength.

The wording high intensity light source should be understood as a light source being arranged to have high irradiance of preferably more than $1\cdot 10^8$ W/m² more preferably $1\cdot 10^9$ W/m² and most preferably $1\cdot 10^{11}$ W/m². The high intensity light source may be a laser diode and/or a light emitting diode, LED. The high intensity light source may be monochromatic. A light beam emitted by the high intensity light source in the form of a laser typically has a Gaussian intensity distribution, taken along a cross sectional profile being perpendicular to an optical axis of the outgoing light beam. A light beam emitted by the high intensity light source in the form of a LED typically has a Lambertian, intensity distribution, taken along a cross sectional profile being perpendicular to an optical axis of the outgoing light beam. Hence, the cross sectional profile of the light beam emitted by the high intensity light source is not homogenous and it shows a large variation as a function of position.

The wording beam shaping optical element should be understood as an element which acts upon light such that an incoming light beam is reshaped into an outgoing okaylight beam. In particular the beam shaping optical element is configured to redistribute the incoming light beam into the outgoing light beam having a far field beam cross sectional profile having a spatially flat light distribution. Flat intensity distribution has preferentially not more than 10% variation and more preferentially not more than 5% and more preferentially not more than 3% variation with respect to the mean intensity over the whole surface.

The wording light converting member should be understood as any member that converts light of a first wavelength to light of a second wavelength. The wavelength conversion may be due to luminescence, fluorescence, and/or phosphorescence providing generation of a Stokes shift in the wavelength of the converted emitted light relative to the wavelength of the illuminating light. The light converting member comprises a light converting element. It is the light converting element that is actually performing the light convention. The light converting element is configured to be irradiated by the outgoing light beam.

The light emitting apparatus provides an increased efficiency of the light conversion at the light converting member. This is due to that the light beam falling onto the light converting member has a flat profile. This will provide a light beam homogenous cross sectional profile at the light converting member. Hence inhomogeneous heating of the light converting member will be avoided. In this way the light converting member can be homogeneously heated and local extra heating which can lead to thermal quenching can be avoided. This will increase the efficiency of the light converting member.

The beam shaping optical element may comprise a waveguide having a non-circular cross section. The cross section is taken perpendicular to an optical axis of the waveguide. A non-circular wave guide has very good spatial light mixing properties in order to obtain the homogenous light distribution at the out-coupling end of the waveguide. The non-circular wave guide may be an optical fiber. The non-circular cross section of the wave guide may be chosen from the group consisting of triangular, square, pentagonal, hexagonal and octagonal. The edges may be rounded or sharp. Hence, the non-circular out-coupling end of the waveguide may be imaged to illuminate the light converting element.

The beam shaping optical element may comprise a diffractive optical element. The diffractive optical element is phase element configured to transform a Gaussian shaped input light beam into a light beam having a uniform spot with sharp edges at a specific working distance. The diffractive optical element comprises a lens and a diffractive pattern.

The beam shaping optical element may be a top hat beam shaper. The top hat beam shaper is an optical element configured to transform a Gaussian shaped input light beam into a light beam having a uniform spot with sharp edges at a specific working distance.

The light emitting apparatus may further comprise an optical fiber configured to guide the light emitted by the high intensity light source to the beam shaping optical element. Hence, it may be secured that substantially all the light emitted from the high intensity light source will reach the beam shaping optical element resulting in improved brightness of the light emitting apparatus.

The beam shaping optical element preferentially produces a beam shape which has almost the same shape of the light converting element.

The light emitting apparatus may further comprise a plurality of high intensity light sources. Improved brightness of the light emitting apparatus may hence be achieved. Comprising a plurality of high intensity light sources, the light emitting apparatus may further comprise a plurality of optical fibers configured to guide light emitted by a corresponding high intensity light source to the beam shaping optical element. Combining a plurality of light sources may be done by a so called relay lens. However, this will result in critical tolerances and severe tolerances of the light sources with respect to the optical components. Using the plurality of optical fibers according to the above the light emitting apparatus may comprise a plurality of light sources without the need of the critical tolerances and severe tolerances of the light sources.

An area of an in-coupling end of the beam shaping optical element may be larger than an area of an out-coupling end of each of the optical fibers. Hence, a cross sectional area of the beam shaping optical element, taken perpendicular to the optical axis of the beam shaping optical element, may be larger than a cross sectional area of each of the corresponding optical fibers, taken perpendicular to the optical axis of the optical fiber.

A sum of the areas of the out-coupling ends of the cores of the optical fibers may be equal or smaller than the area of the in-coupling end of the beam shaping optical element. This will allow for combining a plurality of small diameter optical fibers into one non-circular waveguide.

The beam shaping optical element may be configured to redistribute the light of the first wavelength emitted by the high intensity light source into the outgoing light beam such that the outgoing light beam has a contour corresponding to a contour of a light converting element of the light converting member. Hence, the shape of the outgoing light beam will match the shape of the light converting element of the light converting member. This will secure an even light distribution on the whole light converting element; hence, providing for an improved efficiency of the light conversion at the light converting member. The light converting member may further be arranged to transmit and/or reflect light of the first wavelength.

The system is configured so that light emitted by the light converting element has a Luminance preferably more than 0.5 GCd/m$^2$ more preferably more than 1 GCd/m$^2$ and most preferably more than 3 GCd/m$^2$.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment.

instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
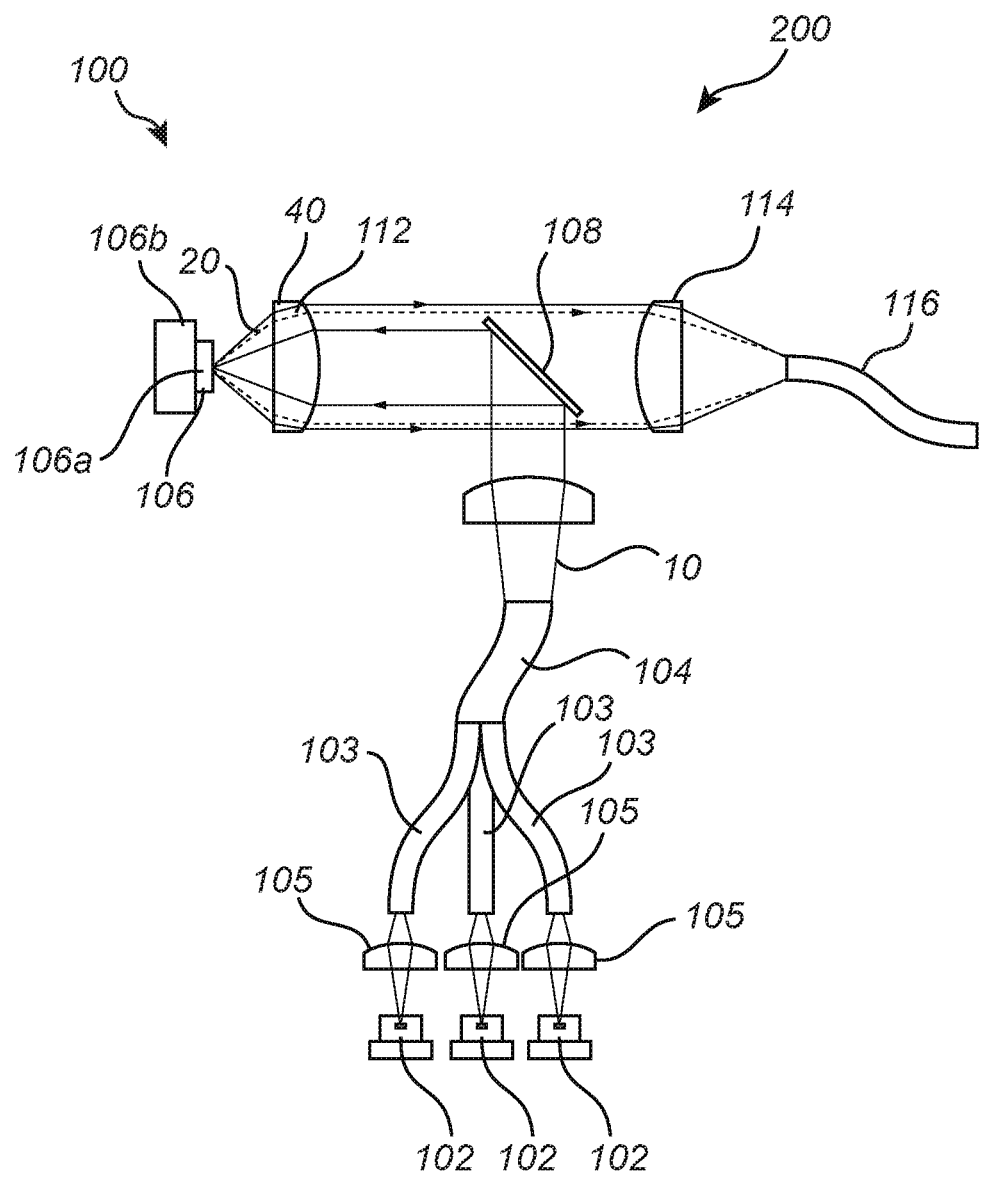
FIGS. 1 and 2 illustrate cross-sectional side views of a respective light emitting apparatus.
Figure 2:
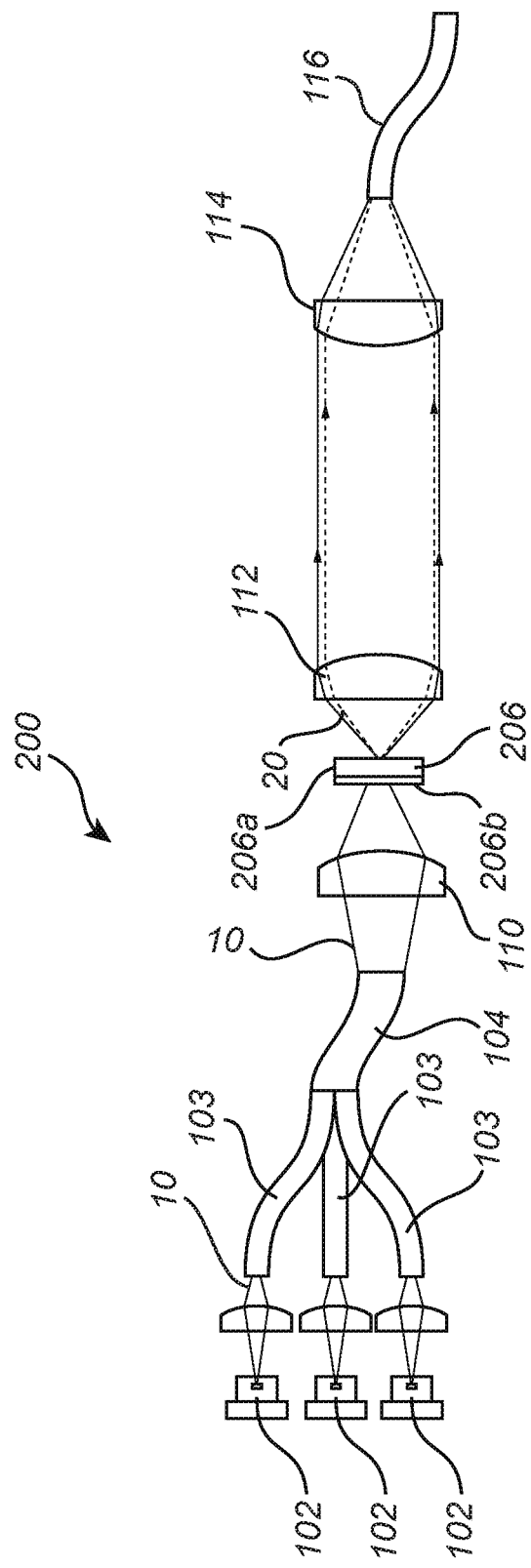

In connection with FIGS. 1 and 2 two alternative embodiments of light emitting apparatuses 100, 200 are disclosed. The function of the in FIGS. 1 and 2 illustrated light emitting apparatuses 100, 200 is similar except for how light of a first wavelength 110 emitted from a respective high intensity light source 102 (or high intensity light sources 102) is directed towards a light converting member 106. In FIG. 1 a reflective arrangement of a light emitting apparatus 100 is illustrated and in FIG. 2 a transmissive arrangement a light emitting apparatus 200 is illustrated. Common for both light emitting apparatuses 100 and 200 is that white light of high brightness is obtained by partially converting the light of the first wavelength 10 into light of a second wavelength 20 using the light converting member 106.

Below, the reflective arrangement of the light emitting apparatus 100 according to FIG. 1 will be described and thereafter the transmissive arrangement the light emitting apparatus 200 according to FIG. 2 will be described. After that, some more common features of both the reflective and transmissive embodiments of the light emitting apparatus 100, 200 will collectively be described.

The light emitting apparatus 100 comprises one or more high intensity light sources 102, a beam shaping optical element 104 and a light converting member 106.

The one or more high intensity light sources 102 are arranged to emit light of the first wavelength 10. The one or more high intensity light sources may be a laser diode and/or a light emitting diode, LED. The one or more high intensity light sources 102 may be monochromatic, for instance emitting blue light. Light of the first wavelength 10 emitted from the one or more light sources 102 is directed towards the light converting member 106 in a reflective mode. The light beam emitted by the high intensity light source typically has a Gaussian cross sectional profile, taken perpendicular to an optical axis of the outgoing light beam. Hence, the cross sectional profile of the light beam emitted by the high intensity light source is not homogenous.

Figure 3:
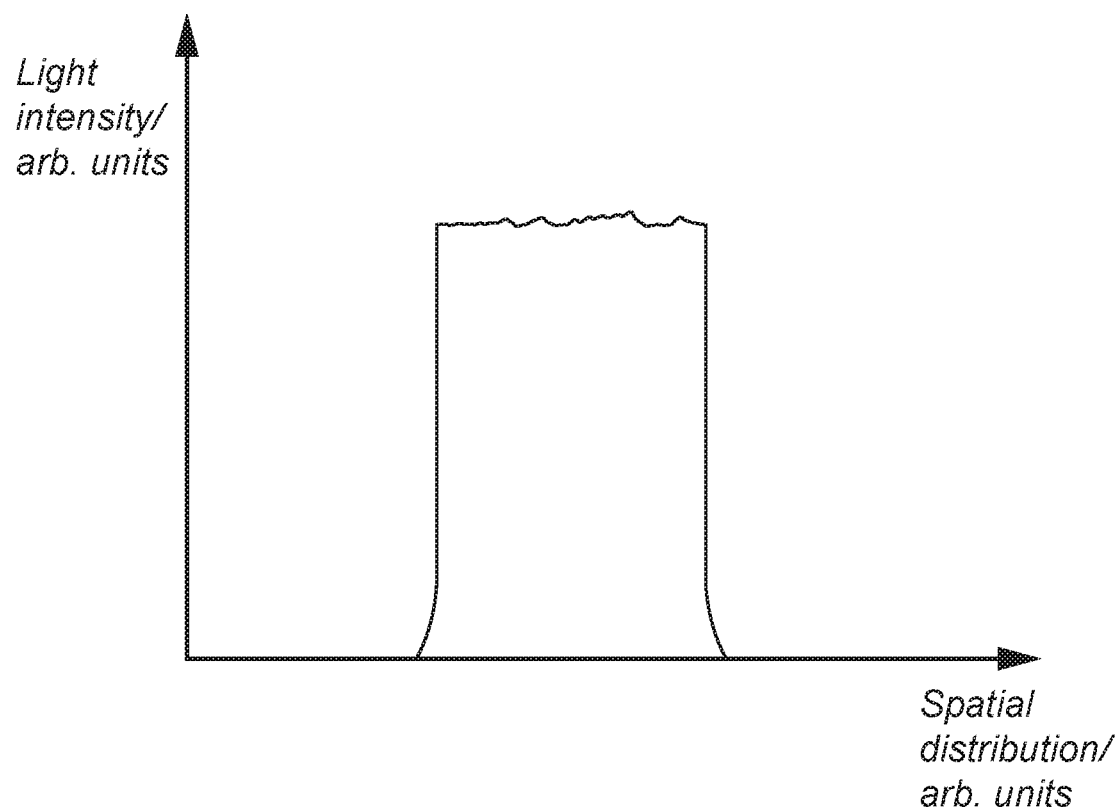
FIG. 3 illustrates a cross sectional profile of a light beam emitted by a beam shaping optical element of any one of the light emitting apparatus of FIGS. 1 and 2.

The beam shaping optical element 104 is configured to reshape an incoming light beam into an outgoing light beam. The incoming light beam comprises the light emitted from the one or more high intensity light sources 102. The outgoing light beam comprises the light being directed towards the light converting member 106. In particular the beam shaping optical element 104 is configured to redistribute the incoming light beam into the outgoing light beam such that it exhibit a far field beam cross sectional profile having a spatially flat light distribution. Hence, the outgoing light beam will exhibit a top hat shape. This is illustrated in FIG. 3. Hence, the beam shaping optical element 104 is configured to redistribute the light in the incoming light beam such that a cross sectional profile taken perpendicular to an optical axis of the outgoing light beam in the far field of the outgoing light beam has a homogeneous light distribution. The term homogeneous should in this context be interpreted as maximum variety of the light intensity of +10% within flat light distribution. Accordingly, the beam shaping optical element 104 is configured to redistribute the incoming light beam having a Gaussian or Lambertian cross sectional profile into an outgoing light beam having a non-Gaussian or non-Lambertian far filed beam cross sectional profile. Hence, the beam shaping optical element 104 may be a top hat beam shaper. The top hat beam shaper is an optical element configured to transform a Gaussian or Lambertian shaped input light beam into a light beam having a uniform spot with sharp edges at a specific working distance.

According to the embodiments of FIGS. 1 and 2 the beam shaping optical element 104 is a waveguide. However, other beam shaping optical element 104 may also be used as will be discussed in more detail below. The waveguide has a non-circular cross section, taken perpendicular to an optical axis of the waveguide. A non-circular wave guide has very good light mixing properties in order to obtain the homogenous light distribution at an out-coupling end of the waveguide. The non-circular wave guide may be an optical fiber. The non-circular cross section of the wave guide may be chosen from the group consisting of triangular, square, pentagonal, hexagonal and octagonal. The edges may be sharp. The edges may be rounded.

The non-circular out-coupling end of the beam shaping optical element 104 in the form or the waveguide may be imaged to illuminate the light converting element 106. Hence, the beam shaping optical element 104 may be configured to redistribute the light of the first wavelength emitted by the one or more high intensity light sources 102 into the outgoing light beam such that the outgoing light beam has a contour corresponding to a contour of a light converting element 106a of the light converting member 106. Hence, the shape of the outgoing light beam will match the shape of the light converting element 106a of the light converting member 106. This will secure an even light distribution on the whole light converting element 106a; hence, providing for an improved efficiency of the light conversion at the light converting member 106. For example, in case of using a square shaped light converting element 106a the beam shaping optical element 104 may be configured to redistribute the light of the first wavelength 10 emitted by the one or more high intensity light sources 102 into the outgoing light beam such that the outgoing light beam has a square contour. A square light converting element shape is advantageous from an efficient cutting process point of view. It is easy to produce a light converting element 106a having a square shape.

In case of imaging the non-circular out-coupling end of the beam shaping optical element 104, the shape of the image non-circular out-coupling end at the light converting element 106a will match the shape of the light converting element 106a.

The light emitting apparatus 100 may further comprise one or more optical fibers 103. The one or more optical fibers 103 are configured to guide the light emitted by the one or more high intensity light sources 102 to the beam shaping optical element 104. The number of optical fibers 103 may be equal or less than the number of high intensity light sources 102. In the in FIGS. 1 and 2 disclosed embodiments the light emitted by the one or more high intensity light sources 102 are coupled into a corresponding optical fiber 103 via a coupling lens 105. However, it is also possible to emit the coupling lenses 105 and make a so called butt-coupling of the light emitted by the one or more high intensity light sources 102 directly into the corresponding optical fiber 103. Hence, it may be secured that substantially all the light emitted from the one or more high intensity light sources 102 will reach the beam shaping optical element 104 resulting in improved brightness of the light emitting apparatus 100.

Figure 4:
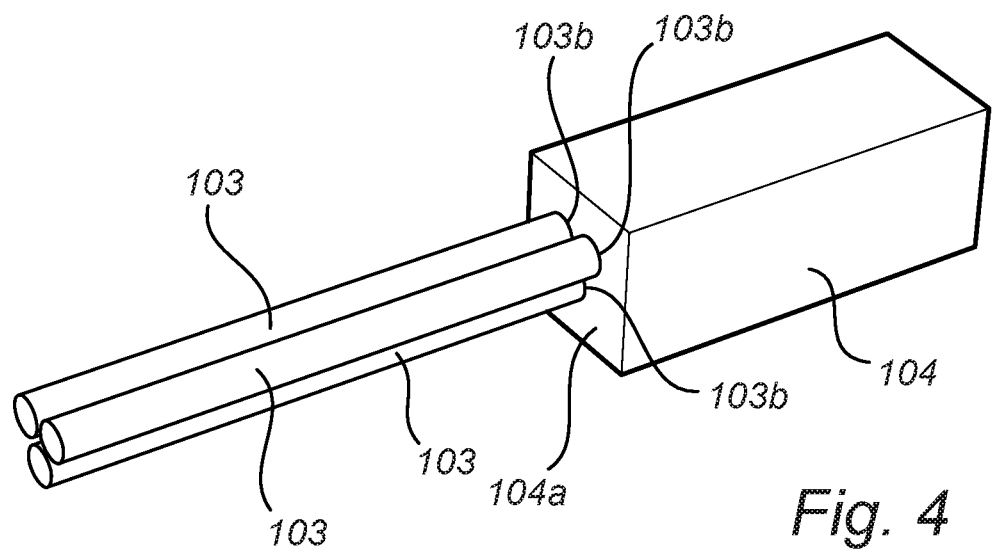
FIG. 4 illustrates a perspective side view of an embodiment of a beam shaping optical element being connected to a plurality of optical fibers guiding light into the beam shaping optical element.

An area of an in-coupling end 104a of the beam shaping optical element 104 may be larger than an area of an out-coupling end 103b of each of the optical fibers 103. As a non limiting example the cross sectional area of the one or more optical fibers 103 may be 0.01 to 0.5 mm$^2$. Moreover, as a non limiting example the cross sectional area of the beam shaping optical element 104 may be 0.04 to 2.0 mm$^2$. Hence, a cross sectional area of the beam shaping optical element 104, taken perpendicular to the optical axis of the beam shaping optical element 104, may be larger than a cross sectional area of each of the corresponding optical fibers 103, taken perpendicular to the optical axis of the optical fiber 103. This is illustrated in FIG. 4. Moreover, a sum of the areas of the out-coupling ends 103b of the optical fibers 103 may be equal or smaller than the area of the in-coupling end 104a of the beam shaping optical element 104. This will allow for combining a plurality of small diameter optical fibers 103 into one beam shaping optical element 104 in the form of a non-circular waveguide.

The light converting member 106 comprises the light converting element 106a. The light converting element 106a is configured to convert light of the first wavelength 10 into light of a second wavelength 20. The light converting element 106a is further arranged to emit the light of the second wavelength 20. As a non-limiting example, the surface area of the light converting element 106a may be 0.3 to 0.04 mm². The one or more high intensity light sources 102 have a typical power of several watts. Hence, the irradiance at the light converting element 106a may be in the order of 100 W/mm².

The light converting member 106 is further arranged to reflect light of the first wavelength 10.

The light converting member 106 may further comprise a heat sink 106b. The surface of the heat sink 106b facing the light converting element 106a is preferably reflective.

The light emitting apparatus 100 may further comprise a reflector 108. The reflector may be a dichroic reflector. However, the skilled person in the art realizes that the reflector may in other embodiments be a mirror or a diffractive grating. The reflector 108 is arranged to reflect light of the first wavelength 10. The reflector 108 when being a dichroic reflector is arranged to transmit light of a second wavelength 20.

The light emitting apparatus 100 may further comprise an optical element 110. The optical element 110 is arranged to image light of the first wavelength 10 onto the light converting member 106. Light of the first wavelength 10 emitted from the one or more light sources 102 are hence arranged to be imaged onto the light converting member 106.

In case of imaging the non-circular out-coupling end of the beam shaping optical element 104 by optical element 110, the shape of the image non-circular out-coupling end at the light converting element 106a will match the shape of the light converting element 106a.

The below description is directed to the transmissive embodiment of the light emitting apparatus 200 as disclosed in connection with FIG. 2. The embodiment of the transmissive light emitting apparatus 200 of FIG. 2 very much resembles the embodiment of the reflective light emitting apparatus 100 of FIG. 1. Hence, reference is made to the above. However, for the transmissive light emitting apparatus 200 no reflector 108 is needed. Moreover, the optical element 110 may be omitted.

Moreover, the light converting member 206 of the transmissive light emitting apparatus 200 may be designed differently than the light converting member 106 of the reflective light emitting apparatus 100. The light converting member 206 comprises a light converting element 206a. The light converting element 206a is configured to convert light of the first wavelength 10 into light of a second wavelength 20. The light converting element 206a is further arranged to emit the light of the second wavelength 20. As a non-limiting example, the surface area of the light converting element 206a may be 0.3 to 0.04 mm². The one or more high intensity light sources 102 have a typical power of several watts. Hence, the irradiance at the light converting element 206a may be in the order of 100 W/mm².

The light converting member 206 is further arranged to transmit light of the first wavelength 10.

The light converting member 206 may further comprise a heat sink (not shown). The heat sink may for example comprise a through hole though which the light from the beam shaping optical element 104 may enter so that the light converting element 206a will be irradiated. Moreover, the surface of the heat sink facing the light converting element 206a is preferably reflective. The light converting member 206 may further comprise a dichroic reflector 206b. The dichroic reflector 206b is arranged to transmit light of the first wavelength 10 and to reflect light of the light of the second wavelength 20.

The below description is directed to both the embodiment of the reflective light emitting apparatus 100 disclosed in connection with FIG. 1 and the transmissive light emitting apparatus 200 disclosed in connection with FIG. 2.

The light emitting apparatus 100, 200 may comprise a collecting optical element 112. The collecting optical element 112 is arranged to collect light (of various wave lengths, especially light of the first and second wave lengths) emitted, transmitted and/or reflected from the light converting member 106. The collecting optical element 112 may be referred to as a collimating optical element providing collimation of the light in the focus of the collecting optical element 112, i.e. substantially parallel rays of light may leave the collecting optical element 112. The collecting optical element 112 may be a lens, here illustrated as a plano-convex lens but the skilled person in the art realizes that other lenses or mirrors and lens or mirror systems may be used.

The light emitting apparatus 100, 200 may comprise a mixing member 116. The mixing member 116 is arranged to mix light entering the mixing member 126. The light entering the mixing member 126 originates from the light converting member 106 and may comprise a spatially varying spectral composition, i.e. light of the first 10 and the second 20 wavelength may be separated in space. The light that enters the mixing member 126 is mixed spatially by for instance multiple reflections and/or diffraction. The light leaving the mixing member 126 may thereby have a spatially more uniform spectral distribution than the light entering the mixing member 126. A light emitting apparatus 100, 200 providing a spatially more uniform output of light may thereby be obtained. As mentioned above, the one or more high intensity light source 102 may be monochromatic, for instance emitting blue light. Hence, the light of the first wavelength 10 may be blue light and the light of the second wavelength 20 may have a longer wavelength than the first wavelength 10, such as yellow light. A combination of the blue and the yellow light may produce white light. By mixing blue and the yellow light with the mixing member 126 the light emitting apparatus 100, 200 may provide white light with a more uniform spectral distribution. The mixing member 126 may be an optical fiber. A simple, cost effective and flexible mixing member 126 may thereby be achieved. The light entering the mixing member 126 may further propagate efficiently in the core of the optical fiber by total internal reflection. The mixing member 126 may alternatively be a transparent rod. The cross-section of the mixing member 126 may be non-circular, for instance having a square, hexagonal or octagonal cross-section in order to improve light mixing.

The light emitting apparatus 100, 200 may further comprise an additional optical element 114. The additional optical element 114 is arranged to focus light into the mixing member 126. A more efficient coupling of light into the mixing member 126 may thereby be obtained and an increased light output from the light emitting apparatus 100, 200 may be achieved.

The light emitting apparatus described above may be used in an application such as digital projection, street lighting, spots, stage lighting, automotive head lights etc.

The person skilled in the art realizes that the present invention by no means is limited to the preferred embodiments described above. On the contrary, many modifications and variations are possible within the scope of the appended claims.

For example, the beam shaping optical element 104 may comprise a diffractive optical element. The diffractive optical element is phase element configured to transform a Gaussian shaped input light beam into a light beam having a uniform spot with sharp edges at a specific working distance. The diffractive optical element may comprise a focusing lens and a diffractive pattern.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting apparatus comprising:
   a high intensity light source configured to emit light of a first wavelength;
   a beam shaping optical element configured to redistribute the light of the first wavelength emitted by the high intensity light source into an outgoing light beam having a far field beam cross sectional profile having a spatially flat light intensity distribution; and
   a light converting element configured
     to be exposed to the outgoing light beam having the spatially flat light intensity distribution,
     to transmit and/or reflect a portion of the light of the first wavelength; and
     to convert another portion of the light of the first wavelength into light of a second wavelength, and to emit the light of the second wavelength; and
   a mixing member configured to receive the light of the first wavelength and the light of the second wavelength from the light converting element and to mix the light of the first wavelength with the light of the second wavelength,
   the beam shaping optical element being configured to redistribute the light of the first wavelength emitted by the high intensity light source into the outgoing light beam such that the far field cross sectional profile of the outgoing light beam is a contour corresponding to a contour of an entirety of the light converting element.

2. A light emitting apparatus according to claim 1, further comprising a collecting optical element configured to collect the light of the first wavelength and the light of the second wavelength from the light converting element.

3. A light emitting apparatus according to claim 1, further comprising an additional optical element configured to focus the light of the first wavelength and the light of the second wavelength into the mixing chamber.

4. The light emitting apparatus according to claim 1, wherein the beam shaping optical element comprises a waveguide having a non-circular cross section.

5. The light emitting apparatus according to claim 4, wherein the waveguide is an optical fiber.

6. The light emitting apparatus according to claim 1, wherein the beam shaping optical element comprises a diffractive optical element.

7. The light emitting apparatus according to claim 1, wherein the beam shaping optical element is a top hat beam shaper.

8. The light emitting apparatus according to claim 1, further comprising an optical fiber configured to guide the light emitted by the high intensity light source to the beam shaping optical element.

9. The light emitting apparatus according to claim 1, further comprising a plurality of high intensity light sources and a plurality of optical fibers, wherein the optical fibers are configured to guide light respectively emitted by the high intensity light sources to the beam shaping optical element.

10. The light emitting apparatus according to claim 9, wherein an area of an in-coupling end of the beam shaping optical element is larger than an area of an out-coupling end of each of the optical fibers.

11. The light emitting apparatus according to claim 10, wherein a sum of the areas of the out-coupling ends of the optical fibers is equal or smaller than the area of the in-coupling end of the beam shaping optical element.

12. The light emitting apparatus according to claim 1, wherein the light emitting apparatus is configured such that an out-coupling end of the beam shaping optical element is imaged on the light converting element.

13. The light emitting apparatus according to claim 1, wherein the mixing member is an optical fiber.

14. The light emitting apparatus according to claim 1, wherein the light emitting apparatus is used in one of the applications from the group of applications consisting of digital projection, street lighting, spots, stage lighting and automotive head lights.

15. The light emitting apparatus according to claim 1, wherein the spatially flat light intensity distribution comprises not more than 10% variation of light intensity with respect to mean light intensity taken over the far field beam cross sectional profile.

16. The light emitting apparatus according to claim 1, wherein the contour of the entirety of the light emitting element is a square.

* * * * *